(12) United States Patent
Takacs

(10) Patent No.: US 7,965,716 B2
(45) Date of Patent: Jun. 21, 2011

(54) EXTENDED VLAN CLASSIFICATION

(75) Inventor: Attila Takacs, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 223 days.

(21) Appl. No.: 12/518,045

(22) PCT Filed: Nov. 27, 2007

(86) PCT No.: PCT/EP2007/062861
§ 371 (c)(1),
(2), (4) Date: Jun. 5, 2009

(87) PCT Pub. No.: WO2008/068161
PCT Pub. Date: Jun. 12, 2008

(65) Prior Publication Data
US 2010/0322254 A1    Dec. 23, 2010

Related U.S. Application Data

(60) Provisional application No. 60/868,833, filed on Dec. 6, 2006.

(51) Int. Cl.
*H04L 12/54* (2006.01)
(52) U.S. Cl. .................. 370/392; 370/401; 370/419
(58) Field of Classification Search .................. None
See application file for complete search history.

(56) References Cited

U.S. PATENT DOCUMENTS
2006/0002386 A1    1/2006    Yik et al.

*Primary Examiner* — Jayanti K Patel
*Assistant Examiner* — Matthew Campbell

(57) ABSTRACT

A bridge and method are described herein that translate at least a portion of a port VID (VLAN identifier) for an incoming tagged frame to form a relay VID for a corresponding relay tagged frame by using a VID mask table, a VID filter table, and a VID rule table. In an additional embodiment, the bridge and method also implement a port VLAN membership technique to ensure that an ingress port associated with the port VID is a member of the current VLAN.

10 Claims, 5 Drawing Sheets

EXTENDED VLAN CLASSIFICATION

CLAIM BENEFIT OF PRIOR FILED U.S. APPLICATION

This application claims the benefit of U.S. Provisional Patent Application Ser. No. 60/868,833 which was filed on Dec. 6, 2006 the contents of which are hereby incorporated by reference herein.

TECHNICAL FIELD

The present solution relates to a method, a bridge and a computer program that optimizes a VLAN translation within a network.

BACKGROUND

The following abbreviations are herewith defined, at least some of which are referred to within the following description of the prior art and the present solution.
C-TAG Customer VLAN TAG
C-VID Customer VID
IEEE Institute of Electrical and Electronics Engineers
PBN Provider Bridged Networks
S-TAG Service VLAN TAG
S-VID Service VID
SPB Shortest Path Bridging
STI Spanning Tree Instances
VID VLAN Identifier
VLAN Virtual Local Area Network The Shortest Path Bridging (SPB) proposal standardized in the IEEE relies on multiple spanning trees where each bridge has a dedicated spanning tree over which all of the other bridges can be reached on a shortest path (see "Shortest Path Bridging," IEEE P802.1aq/D0.3, May 9, 2006—the contents of which are incorporated by reference herein). A network implementing this shortest path bridging standard has a requirement that every bridge injecting traffic (or frames) into a SPB domain must transmit this traffic over their respective dedicated source routed spanning tree. Further, these bridges to avoid loops have another requirement where they must forward this traffic over the same dedicated spanning tree while the traffic is within the SPB domain of the network.

These requirements have been graphically illustrated in the network 100 shown in FIG. 1 where a spanning tree that is rooted at bridge A uses VLAN #1 (see lines 102a) and a spanning tree that is rooted at bridge E uses VLAN #2 (see lines 102b). Also in accordance with these requirements, the traffic entering through bridge A and E must be respectively mapped to the VLAN #1 and VLAN #2 so it can be appropriately forwarded through the SPB domain 104. This type of mapping is known in the field as VLAN classification or VLAN translation. In this example, the SPB domain 104 is made-up of bridges B, C, D, F, G, H, and I and it could be assumed that each of these bridges B, C, D, F, G, H, and I use a different forwarding scheme or VLAN mapping scheme than the root bridges A and E.

To implement these requirements, a new way of mapping VLANs to spanning tree instances (STIs) was proposed by Norman Finn in an IEEE presentation entitled "Shortest Patch Bridging" on Sep. 22, 2005. Basically, it was proposed that the root bridges A and E transmit traffic with a 12 bit VLAN identifier that may be logically subdivided into an R part, a M part and a C part (see FIG. 2). These three parts are defined as follows:

Root Part (R): specifies which root bridge is used when routing the frame. It identifies the bridge that injected the traffic into the SPB domain.
Multipath Part (M): specifies which set of link cost parameters is used when routing the frame. If there are multiple alternative trees that form a root bridge then this part is used to differentiate among them.
Community Part (C): specifies a particular VLAN. This is the traditional interpretation of the VLAN ID (VID).
Note: This 12 bit VLAN identifier which has the 3 bit R part, 4 bit M part and 5 bit C part is just an example associated with the SPB context and it should be appreciated that the 12 bit VLAN identifier can in other contexts be defined to have different parts and field sizes.

If the 12 bit VLAN identifier is used to identify the root bridge and as such the spanning tree that must be used to forward the traffic then it follows that the root bridge needs to perform a VLAN classification of data frames to support this particular identification. In practice, the root bridge performs this VLAN classification when it receives tagged frames or untagged frames. The root bridge's VLAN classification of untagged frames is not problematical since the needed VLAN tag can be added in accordance with anyone of the following well known tagging schemes:

1. Port based classification: the root bridge has a single PVID configured per port and all frames that enter at this port are tagged with the same PVID value. See, IEEE P802.1Q-REV/D5.0, "Virtual Bridged Local Area Networks," Sep. 12, 2005 (the contents of which are incorporated by reference herein).
2. Port and Protocol based classification: the root bridge assigns multiple VID values to frames entering on the same port. The differentiation is based on the specific Ethernet Type values set in the frame headers. See, IEEE P802.1Q-REV/D5.0, "Virtual Bridged Local Area Networks," Sep. 12, 2005 (the contents of which are incorporated by reference herein).
3. S-VLAN translation: the root bridge (in particular provider bridge) has a VLAN translation table configured on specific bridge ports that specify a one-to-one bidirectional mapping between Port VIDs (VID received in incoming frames) and Relay VIDs (VID used for relaying the frames). To implement this scheme, the S-VID (Service VLAN) was defined which is a new VLAN type that is used in PBN networks. This new scheme introduces a VLAN hierarchy, as multiple C-VLANs (Customer VLANs) can be multiplexed into S-VLANs at PBN edge bridges. See, IEEE P802.1ad/D6.0, "Provider Bridges," Aug. 17, 2005 (the contents of which are incorporated by reference herein).

However, the root bridge's VLAN classification of tagged frames is problematical since current VLAN translations schemes require the translation of the whole 12 bit VLAN identifier that is a full 12 bit value is translated into another full 12 bit value. As can be appreciated, this operation does not allow the use and/or consideration of logical interpretation of the specific parts of the 12 bit VLAN field. This problem and other problems are addressed by the present solution.

SUMMARY

In one aspect, the present solution provides a method for translating at least a portion of a port VID for an incoming tagged frame to form a relay VID for a corresponding relay tagged frame using a VID mask table, a VID filter table, and a VID rule table. In one embodiment, the method comprising the steps of: (a) obtaining the port VID from the incoming tagged frame; (b) locating one or more masked bits in a first element of the VID mask table; (c) selecting one or more bits from the port VID where these selected bits are in a same location as the masked bits in the first element of the VID mask table; (d) checking to determine if the selected bits from the port VID have similar values to one or more bits in a same location within a first element of the VID filter table; (e) if no, then repeating the locating step, the selecting step and the checking step except that subsequent elements are utilized from the VID mask table and the VID filter table; and (f) if yes, selecting one or more bits from the currently used element in the VID rule table where these selected bits are in a same location as the masked bits in the currently used element of the VID mask table and using the selected bits from the VID rule table to translate the port VID into the relay VID.

In another aspect, the present solution provides a bridge, comprising a processor and a storage unit where the processor obtains instructions from the storage unit and processes those instructions to translate at least a portion of a port VID for an incoming tagged frame to form a relay VID for a corresponding relay tagged frame by accessing a VID mask table, a VID filter table, and a VID rule table. In one embodiment, the bridge enables the follows steps: (a) obtaining the port VID from the incoming tagged frame; (b) locating one or more masked bits in a first element of the VID mask table; (c) selecting one or more bits from the port VID where these selected bits are in a same location as the masked bits in the first element of the VID mask table; (d) checking to determine if the selected bits from the port VID have similar values to one or more bits in a same location within a first element of the VID filter table; (e) if no, then repeating the locating step, the selecting step and the checking step except that subsequent elements are utilized from the VID mask table and the VID filter table; and (f) if yes, selecting one or more bits from the currently used element in the VID rule table where these selected bits are in a same location as the masked bits in the currently used element of the VID mask table and using the selected bits from the VID rule table to translate the port VID into the relay VID.

Additional aspects of the solution will be set forth, in part, in the detailed description, figures and any claims which follow, and in part will be derived from the detailed description, or can be learned by practice of the solution. It is to be understood that both the foregoing general description and the following detailed description are exemplary and explanatory only and are not restrictive of the solution as disclosed.

BRIEF DESCRIPTION OF THE DRAWINGS

A more complete understanding of the present solution may be obtained by reference to the following detailed description when taken in conjunction with the accompanying drawings.

DETAILED DESCRIPTION

The present solution relates to a tagging mechanism (referred to herein as the extended VLAN classification technique) that enhances the VLAN classification capabilities of a bridge. Basically, the present solution allows a bridge to translate or change only a part of a VLAN tag (or port VID) in an incoming tagged frame and to accomplish this there is introduced a wildcard masking of a VID field before a tagging/translation rule is applied to generate the Relay VID for the corresponding relayed or outgoing frame. Although, the present solution is described herein in relation to a SBP context that involves the SPB domain edge ports of a root bridge there is nothing that would prohibit the implementation of the extended VLAN classification technique within different bridges and different ports and/or for other purposes. In addition, the principles of the extended VLAN classification technique may be applied not just to bridges that translate VLAN TAGs but it can also be applied to other (not yet defined) TAG fields as well.

As discussed above, if an untagged frame enters a bridge then it is straightforward for that bridge to use anyone of the known port or port and protocol based VLAN classification techniques that specify the VID value which must be used to tag the frame. In contrast, if the incoming frame has already been tagged then the bridge should apply the extended VLAN classification technique. The extended VLAN classification technique has been designed to satisfy the following requirements:

1. The extended VLAN classification technique has been designed to support the modification of the VID value. This is necessary as the incoming frame may not have the appropriate R part identification (i.e., the assigned root bridge value for the ingress bridge).

2. If an incoming frame has a VID value representation that needs to conform to the R, M, C partitioning used in the SPB domain then the ingress bridge may need to only span the R part or the R and M parts. As such, the ingress bridge may not need to modify the C part since this particular part may be in the control of a host's/customer's logical service separation policy. The extended VLAN classification technique has also been designed to satisfy this requirement.

The extended VLAN classification technique provides bidirectional mapping from Port VIDs to Relay VIDs for tagged frames including, for example, S-Tagged frames and C-Tagged frames. Moreover, instead of requiring an explicit match between the Port VID and the associated entry in the Extended VLAN Classification table, the extended VLAN classification technique allows for the use of wildcard bits. A possible realization of the extended VLAN classification technique is discussed next with respect to FIGS. 3A-3B.

Figure 1:
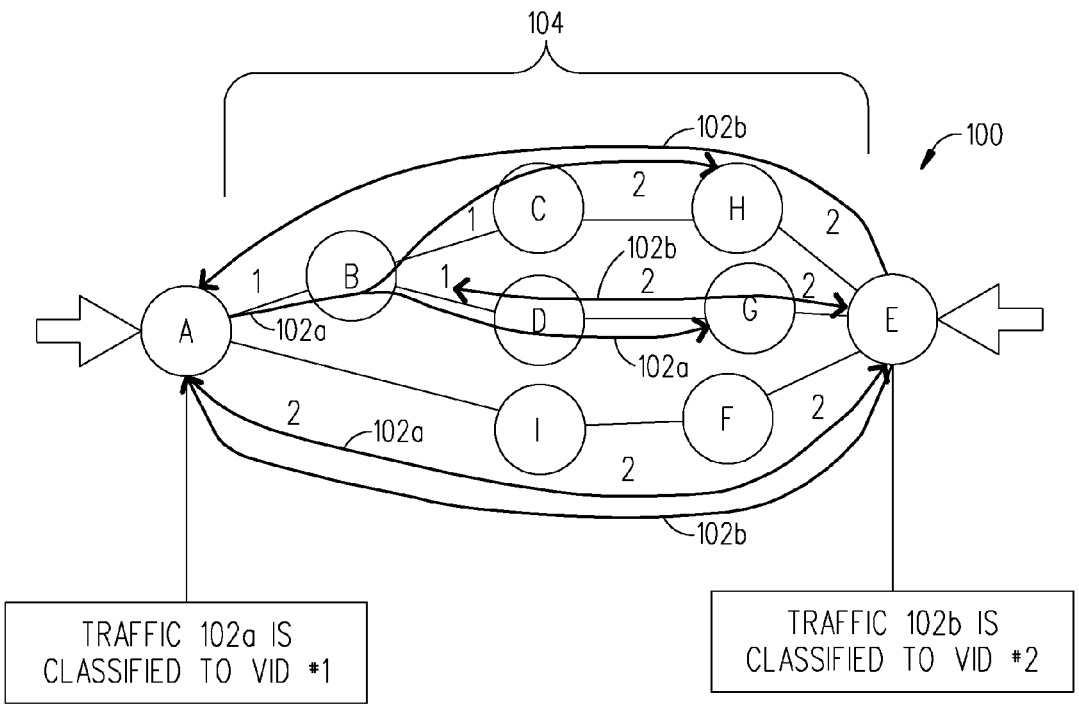
FIG. 1 is a block diagram of a network that is used to help explain the SPB proposal standardized in the IEEE.
Figure 2:
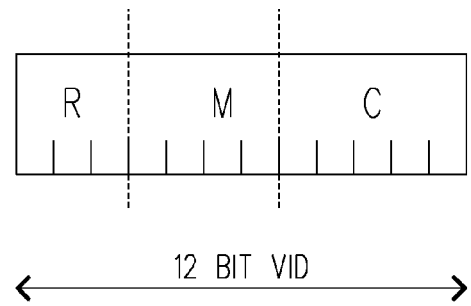
FIG. 2 is a diagram of a 12 bit VLAN identifier which contains a R part, a M part and a C part that is used to help implement the SPB proposal standardized in the IEEE.
Figure 3A:
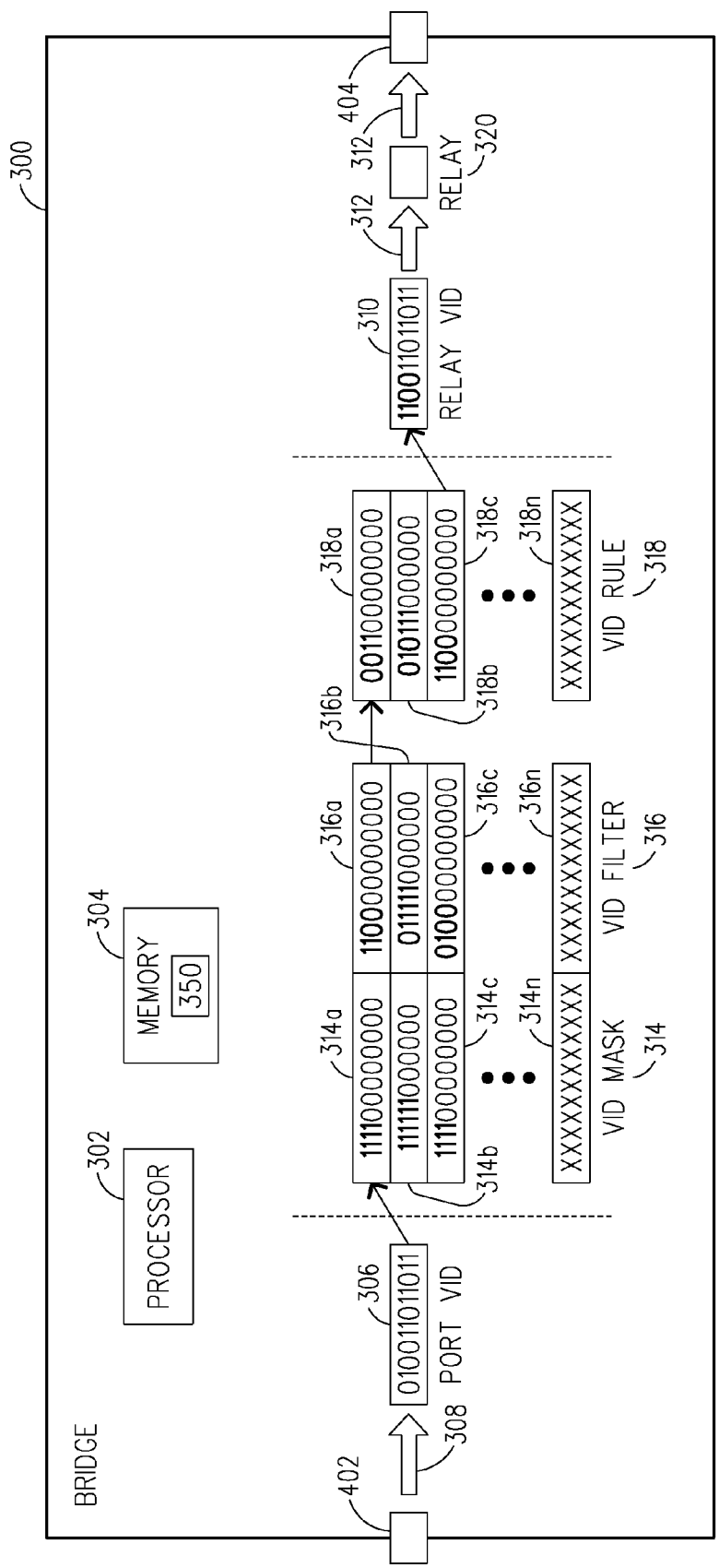
FIGS. 3A-3B are two diagrams which are used to help explain how a bridge implements an extended VLAN classification technique in accordance with the present solution.
Figure 3B:
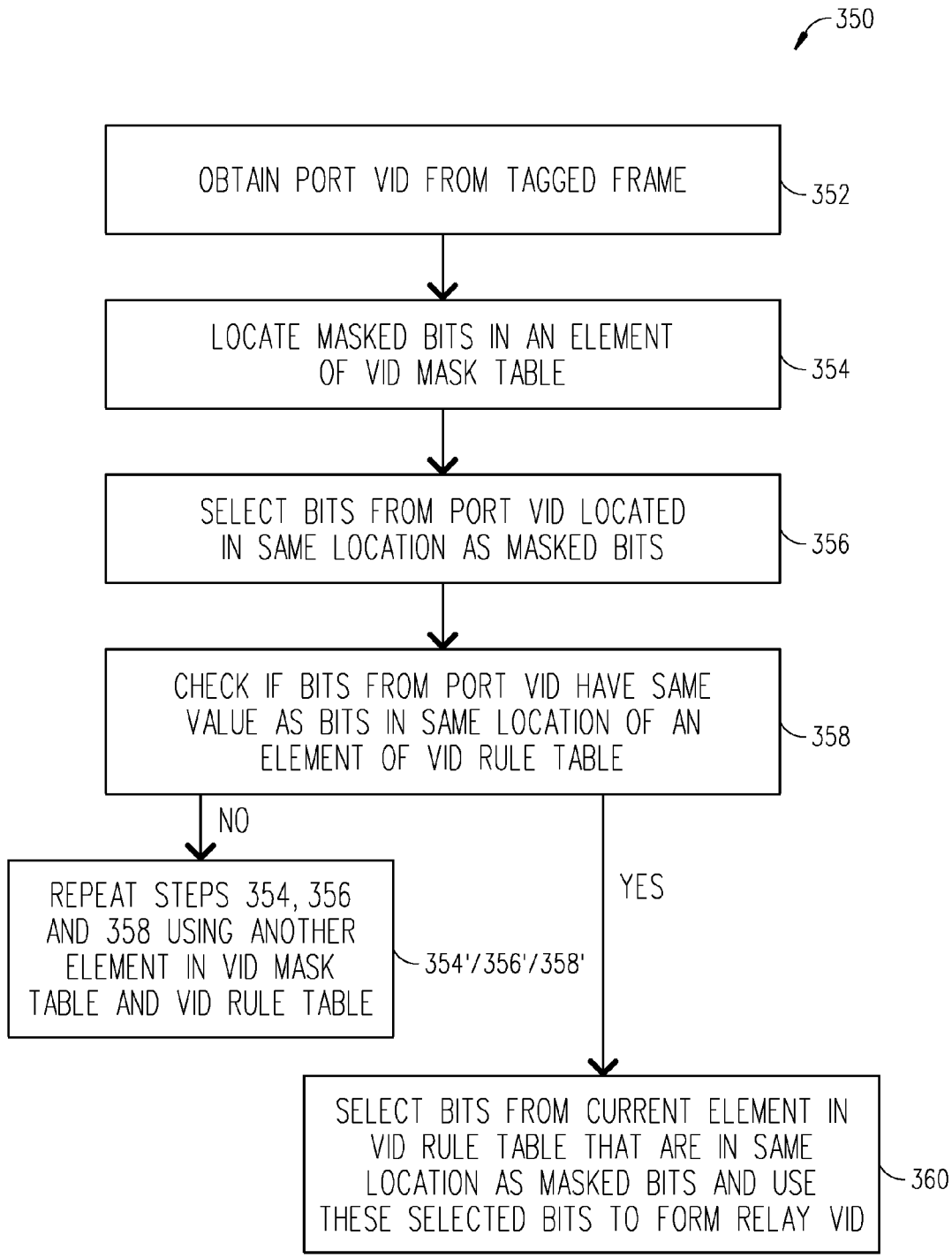

Referring to FIGS. 3A-3B, there are respectively illustrated a block diagram of a bridge 300 and a flowchart of a preferred method 350 (extended VLAN classification technique 350) in accordance with the present solution. As shown in FIG. 3A, the bridge 300 has a processor 302 that retrieves instructions from a memory 304 and processes those instructions to implement method 350 and enable the bridge 300 to translate at least a portion of a port VID 306 for an incoming tagged frame 308 into a relay VID 310 for a corresponding relay tagged frame 312 by using a VID mask table 314, a VID filter table 316, and a VID rule table 318. The bridge 300 also has many other components however for clarity only those components necessary to describe the present solution have been discussed herein.

In the illustrative example, the bridge 300 receives the tagged frame 308 and obtains a port VID 306 which in this example has the 12 bit VLAN identifier "010011011011" (see step 352). The bridge 300 locates the bits which have a value of "1" in the first element 314a of the VID mask table 314 where the bits which have a value "0" are considered "don't care" bits (step 354). In this example, the first four bits have a value of "1" in the first element 314a of the VID mask table 314. The bridge 300 takes (or selects) the corresponding first four bits "0100" from the port VID 306 and checks to see if they have similar values to the corresponding first four bits "1100" in the first element 316a of the VID filter table 316 (steps 356 and 358). As can be seen, there is no match. So, the bridge 300 locates the bits which have a value of "1" in the second element 314b of the VID mask table 314 where the bits which have a value "0" are considered "don't care" bits (step 354'). In this example, the first six bits have a value of "1" in the second element 314b of the VID mask table 314. The bridge 300 takes (or selects) the corresponding first six bits "010011" from the port VID 306 and checks to see if they have similar values to the corresponding first six bits "011111" in the second element 316b of the VID filter table 316 (steps 356' and 358'). Again, there is no match. So, the bridge 300 locates the bits which have a value of "1" in the third element 314c of the VID mask table 314 where the bits which have a value "0" are considered "don't care" bits (repeat step 354'). In this example, the first four bits have a value of "1" in the third element 314c of the VID mask table 314. The bridge 300 takes (or selects) the corresponding first four bits "0100" from the port VID 306 and checks to see if they have similar values to the corresponding first four bits "0100" in the third element 316c of the VID filter table 316 (repeat steps 356' and 358'). There is a match. So, the bridge 300 takes (or selects) the corresponding first four bits "1100" from the third element 318c in the VID rule table 318 and translates the port VID "010011011011" into a relay VID "110011011011" (step 360) (note: there were four bits "1100" taken from the third element 318c in the VID rule table 318 because there were four masked bits "1111" in the third element 314c in the VID mask table 314). Thus, only the first four bits in the port VID 306 where changed to generate the relay VID 310. This is a marked improvement over the prior art.

As can be seen, the bridge 300 implements method 350 to translate at least a portion of a port VID 306 for an incoming tagged frame 308 into a relay VID 310 for a corresponding relay tagged frame 312. In summary, the method 350 starts at step 352 when the bridge 300 obtains the port VID 306 from a received tagged frame 308 (the tagged frame 308 is shown after being received by ingress port 402). At step 354, the bridge 300 locates the masked bits which in this example are the bits which have a value of "1" in a first element 314a of the VID mask table 314 (note: in this example the masked bits are the bits which have a value of "1" while the bits which have a value of "0" are "don't care" bits). At step 356, the bridge 300 takes (or selects) a certain number of bits from the port VID 306 where these selected bits are in a same location as the masked bits in the first element 314a of the VID mask table 314. At step, 358, the bridge 300 checks to see if all of the selected bits from the port VID 306 have similar values to bits in a same location within in the first element 316a of the VID filter table 316. If the result of step 358 is no, then the bridge 300 performs steps 354', 356' and 358' which are the same as steps 354, 356 and 358 except that second elements 314b and 316b in the VID mask table 314 and the VID filter table 316 are utilized in the analysis instead of the first elements 314a and 316a in the VID mask table 314 and the VID filter table 316 (note: each time steps 354', 356' and 358' are performed the bridge 300 accesses and uses another element 314c . . . 314n and 316c . . . 316n in the VID mask table 314 and the VID filter table 316). If the result of step 358 is yes, then the bridge 300 at step 360 takes (or selects) the bits from a currently used element 318a, 318b . . . 318n in the VID rule table 318 (where the selected bits are in a same location as the masked bits in the currently used element 314a, 314b. . .314n of the VID mask table 314) and translates the port VID 306 into the relay VID 310 which is part of the outgoing frame 312. Thereafter, the outgoing frame 312 enters a relay 320 which selects an egress port 404 from which to send the outgoing frame 312. In practice, the administrator should ensure that there are no entries in the tables 314, 316 and 318 that provide the possibility of multiple matches. However, since the masks would typically be applied in the order as they appear in the elements 314a, 314b . . . 314n of the VID mask table 314 until there is a first match, no collision due to multiple matches should arise.

In an additional embodiment, the bridge 300 may perform a port VLAN membership technique 380 to make sure that the ingress port 402 (associated with the incoming frame 308) is a member of the current VLAN before applying the aforementioned extended VLAN classification technique 350. This may be done because if the bridge 300 determines that the ingress port 402 is not a member of the current VLAN then the bridge 300 does not need to apply the extended VLAN classification technique 350. However, if the bridge 300 determines that the ingress port 402 is a member of the VLAN then the bridge 300 would apply the extended VLAN classification technique 350. A possible realization of the port VLAN membership technique 380 is discussed next with respect to FIGS. 4A-4B.

Figure 4A:
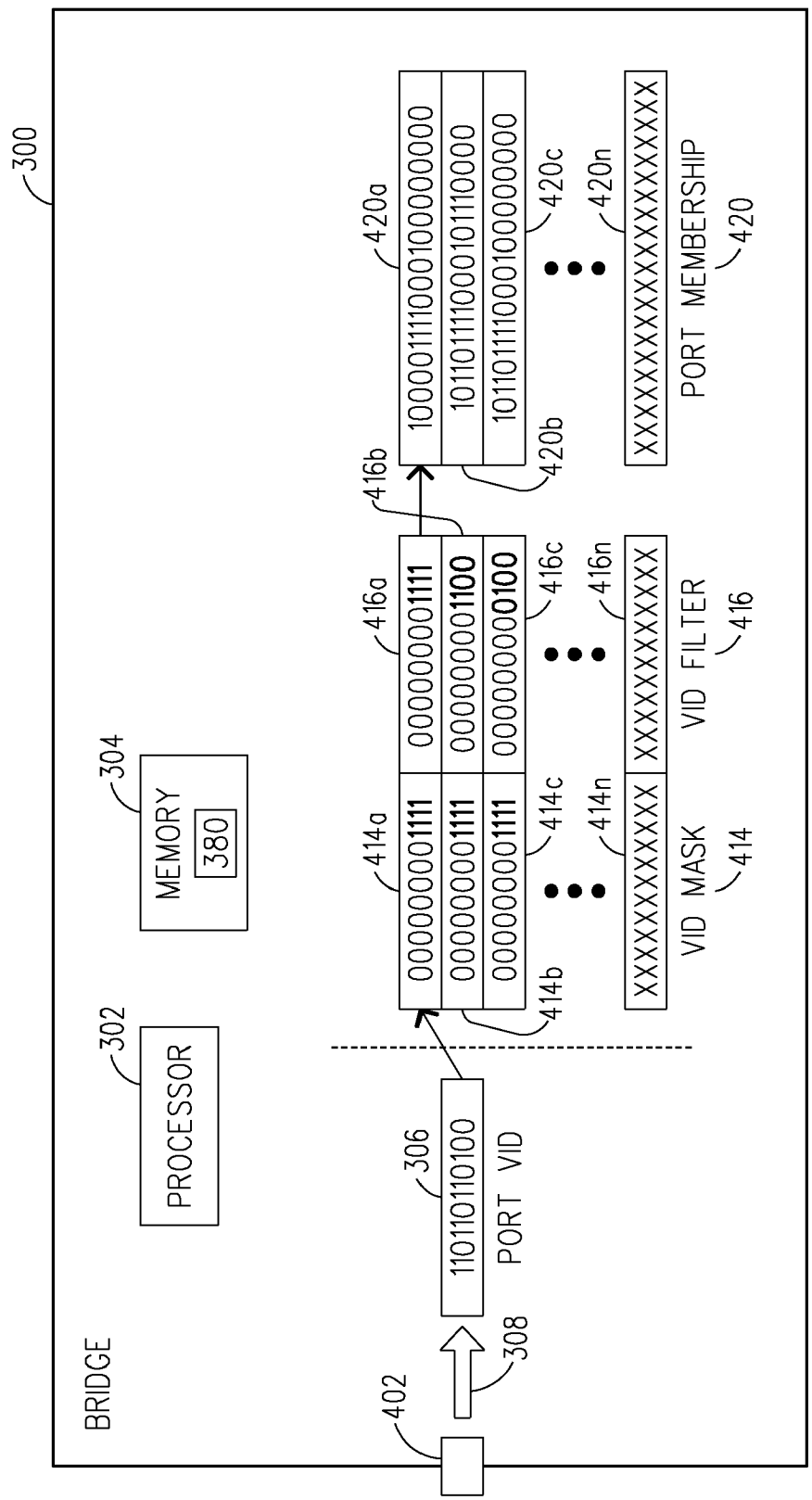
FIGS. 4A-4B are two diagrams which are used to help explain how a bridge implements a port VLAN membership technique in accordance with the present solution.
Figure 4B:
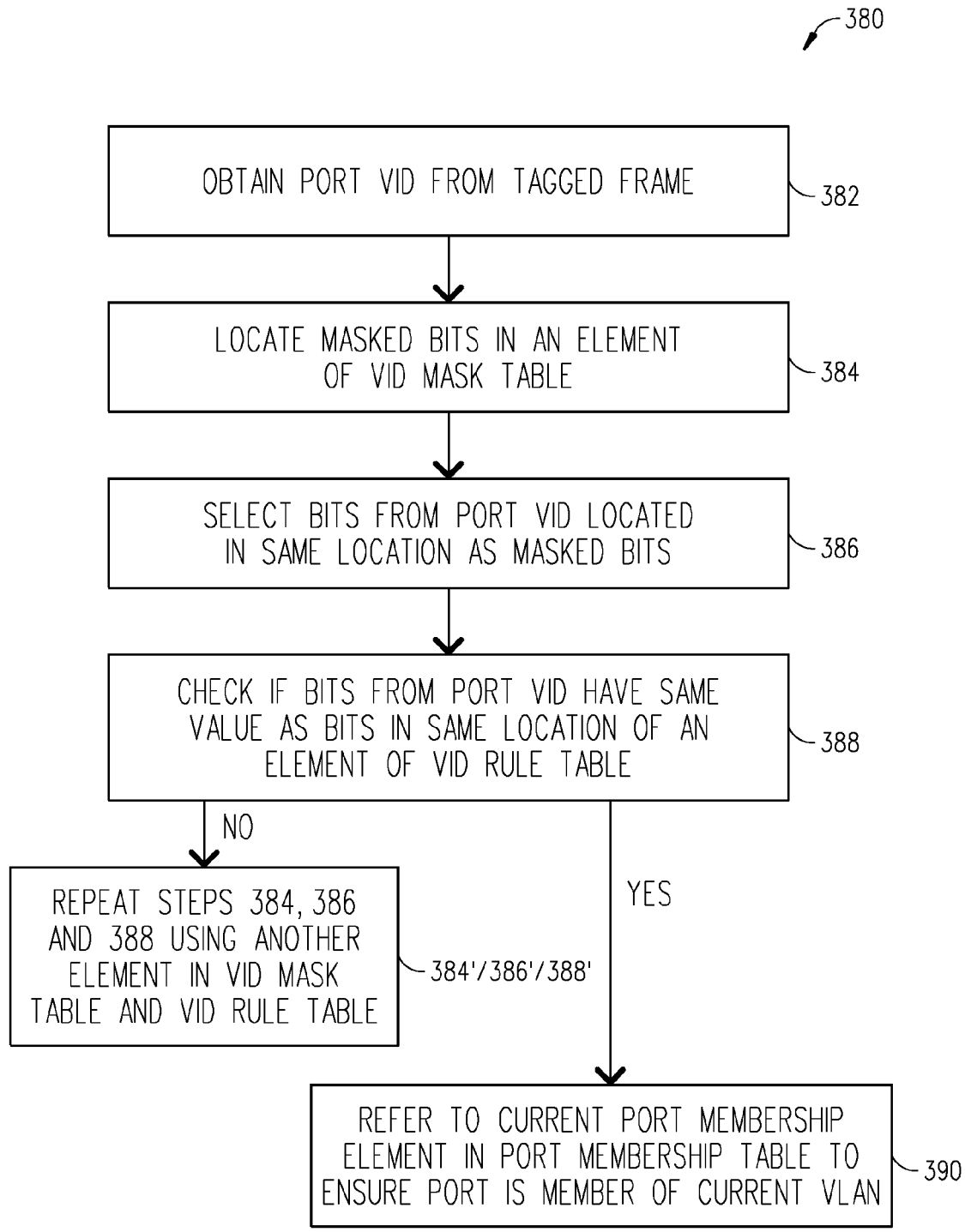

Referring to FIGS. 4A-4B, there are respectively illustrated a block diagram of a bridge 300 and a flowchart of a preferred method 380 (port VLAN membership technique 380) in accordance with the present solution. As shown in FIG. 4A, the bridge 300 has a processor 302 that retrieves instructions from a memory 304 and processes those instructions to implement the various steps of the method 380 to enable the bridge 300 to make sure the ingress port 402 (associated with the incoming frame 308) is a member of the current VLAN.

In this illustrative example, the bridge 300 receives the tagged frame 308 and obtains a port VID 306 which in this example has the 12 bit VLAN identifier "110110110100" (see step 382). The bridge 300 locates the bits which have a value of "1" in a first element 414a of a VID mask table 414 where the bits which have a value "0" are considered "don't care" bits (step 384). In this example, the last four bits have a value of "1" in the first element 414a of the VID mask table 414. The bridge 300 takes (or selects) the corresponding last four bits "0100" from the port VID 306 and checks to see if they have similar values to the corresponding last four bits "1111" in a first element 416a of the VID filter table 416 (steps 386 and 388). As can be seen, there is no match. So, the bridge 300 locates the bits which have a value of "1" in the second element 414b of the VID mask table 414 where the bits which have a value "0" are considered "don't care" bits (step 384'). In this example, the last four bits have a value of "1" in the second element 414b of the VID mask table 414. The bridge 300 takes (or selects) the corresponding last four bits "0100" from the port VID 306 and checks to see if they have similar values to the corresponding last four bits "1100" in the second element 416b of the VID filter table 416 (steps 386' and 388'). Again, there is no match. So, the bridge 300 locates the bits which have a value of "1" in the third element 414c of the VID mask table 414 where the bits which have a value "0" are considered "don't care" bits (repeat step 384'). In this example, the last four bits have a value of "1" in the third element 414c of the VID mask table 414. The bridge 300 takes (or selects) the corresponding first four bits "0100" from the port VID 306 and checks to see if they have similar values to the corresponding last four bits "0100" in the third element 416c of the VID filter table 416 (repeat steps 386' and 388'). There is a match. So, the bridge 300 refers to the corresponding port membership field "101101111000100000000" (which in this example is port membership field 418c) in the port membership table 418 to make sure the ingress port 402 is a member of the VLAN (step 390). This is possible because there is a single bit for all bridge ports in each corresponding port membership field 418a, 418b, 418c . . . 418n where if the bit corresponding to a specific port is set then the ingress port 402 is in the wildcard member set of the respective VLAN, hence this ingress port 402 is allowed to receive the frame 308. If the bit is 0, then the frame 308 must not be accepted by the ingress port 402.

As can be seen, the bridge 300 implements method 380 to make sure that the ingress port 402 (associated with the incoming frame 308) is a member of the current VLAN. In summary, the method 380 starts at step 382 when the bridge 300 obtains the port VID 306 from an incoming tagged frame 308. At step 384, the bridge 300 locates the masked bits which in this example are the bits which have a value of "1" in a first element 414a of the VID mask table 414 (note: in this example the masked bits are the bits which have a value of "1" while the bits which have a value of "0" are "don't care" bits). At step 386, the bridge 300 takes (or selects) a certain number of bits from the port VID 306 where the selected bits are in a same location as the masked bits in the first element 414a of the VID mask table 414. At step 388, the bridge 300 checks to see if all of the selected bits from the port VID 306 have similar values as the bits in a same location with the first element 416a of the VID filter table 416. If the result of step 358 is no, then the bridge 300 performs steps 384', 386' and 388' which are the same as steps 384, 386 and 388 except that the second elements 414b and 416b in the VID mask table 414 and the VID filter table 416 are utilized in the analysis instead of the first elements 414a and 416a in the VID mask table 414 and the VID filter table 416 (note: each time steps 384', 386' and 388' are performed the bridge 300 uses another element 414c . . . 414n and 416c . . . 416n in the VID mask table 414 and the VID filter table 416). If the result of step 358 is yes, then the bridge 300 at step 390 refers to the currently used port membership field 420a, 420b, 420c . . . 420n in the port membership table 420 to make sure the ingress port 402 is a member of the current VLAN. If desired, the method 380 may be used in the SPB context where STIs are identified by VID subfields thus the match of the entire VID is not mandatory to be able to uniquely select a given active topology and the implied forwarding ports. In this case, the wildcard VLAN membership (and untagged) set allows one to restrict ingress filtering only to the C part of the port VID 306 without the need to specify the VLAN membership of ports for all possible R and M parts.

From the foregoing, it should be appreciated that the present solution enables a bridge to implement an extended VLAN technique 350 to translate at least a portion of a port VID 306 for an incoming tagged frame 308 into a relay VID 306 for a corresponding relay tagged frame 312 by using a VID mask table 314, a VID filter table 316, and a VID rule table 318. Plus, the bridge 300 can implement a port VLAN membership technique 380 to determine if a frame 308 and 312 can be accepted from a specific ingress port 402 before implementing the extended VLAN technique 350. Moreover, the present solution has several advantages some of which are as follows:

1. The present solution allows flexible VLAN classification and translation rules to be applied on bridge ports. As such, parts of the VID may be changed while others are kept intact. In addition, the present solution allows one to realize bridging applications which logically partition the VLAN filed and use the resulting subfields for different functionalities.

2. The present solution relates to several ongoing standardization activities of Shortest Path Bridging in the IEEE. For instance, to realize traffic forwarding using symmetrical source routed trees it may be beneficial to implement the disclosed extended VLAN classification technique 350.

It is important to appreciate that present solution does not restrict itself to S/C VLANs but is generally applicable to any VLANs that are currently defined and that could be defined in the future. Further, the present solution is applicable to other Ethernet header fields having any service identification role as well. Basically, the present solution including the aforementioned methods 350 and 380 is not limited to the architecture and the use case described herein and in fact the present solution can be implemented on any bridge and any ingress port.

Although one embodiment of the present solution has been illustrated in the accompanying Drawings and described in the foregoing Detailed Description, it should be understood that the solution is not limited to the disclosed embodiment, but instead is also capable of numerous rearrangements, modifications and substitutions without departing from the spirit of the solution as set forth and defined by the following claims.

The invention claimed is:

1. A method of classifying a virtual local area network (VLAN) the method comprising the steps of:
    translating at least a portion of a VLAN identifier, received in incoming frames (port VID), for an incoming tagged frame to form another VLAN identifier used for relaying frames (relay VID) for a corresponding relay tagged frame using a VID mask table, a VID filter table, and a VID rule table by
    obtaining the port VID from the incoming tagged frame;
    locating one or more masked bits in a first element of the VID mask table;
    selecting one or more bits from the port VID where the selected bits are in a same location as the masked bits in the first element of the VID mask table; and
    determining if the selected bits from the port VID have similar values to one or more bits in a same location within a first element of the VID filter table;
    if no, then repeating the locating step, the selecting step and the determining step utilizing subsequent elements from the VID mask table and the VID filter table; and
    if yes, selecting one or more bits from the currently used element in the VID rule table, where the selected bits are in a same location as the masked bits in the currently used element of the VID mask table, and using the selected bits from the YID rule table to translate the port VID into the relay VID.

2. The method of claim 1, further comprising a step of ensuring an ingress port associated with the port VID is a member of a Current VLAN.

3. The method of claim 2, wherein said ensuring step further includes the steps of:
    obtaining the port VID from the incoming tagged frame;

locating one or more masked bits in the first element of the VID mask table;

selecting one or more bits from the port VID where the selected bits are in a same location as the masked bits in the first element of the VID mask table; and determining if the selected bits from the port VID have similar values to one or more bits in a same location within the first element of the VID filter table;

if no, then repeating the locating step, the selecting step and the determining step utilizing subsequent elements from the VID mask table and the VID filter table and if yes, referring to a currently used port membership element in a port membership table to ensure the ingress port is a member of the current VLAN.

4. The method of claim 1, wherein the incoming tagged frame is a C-tagged frame.

5. The method of claim 1, wherein the incoming tagged frame is a S-tagged frame.

6. A bridge comprising:
a processor; and
a storage unit, said processor for obtaining instruction from said storage unit for processing instructions to translate at least a portion of a port VID for an incoming tagged frame to form a relay VID for a corresponding relay tagged frame by accessing a VID mask table, a VID filter table, and a VID rule table by obtaining the port VID from the incoming tagged frame;

locating one or more masked bits in a first element of the VID mask table;

selecting one or more bits from the port VID where the selected bits are in a same location as the masked bits in the first element of the VID mask table;

determining if the selected bits from the port VID have similar values to one or more bits in a same location within a first element of the VID filter table;

if no, then repeating the locating step, the selecting step and the determining step utilizing subsequent elements from the VID mask table and the VID filter table; and if yes, selecting one or more bits from the currently used element in the VID rule table where these selected bits are in a same location as the masked bits in the currently used element of the VID mask table and using the selected bits from the VID rule table to translate the port VID into the relay VID.

7. The bridge of claim 6, wherein said processor further ensures an ingress port associated with the port VID is a member of a current VLAN.

8. The bridge of claim 7, wherein said processor ensures the ingress port associated with the port VID is a member of the current VLAN step by enabling the following:

obtaining the port VID from the incoming tagged frame;

locating one or more masked bits in the first element of the VID mask table;

selecting one or more bits from the port VID where the selected bits are in a same location as the masked bits in the first element of the VID mask table;

determining if the selected bits from the port VID have similar values to one or more bits in a same location within the first element of the VID filter table;

if no, then repeating the locating step, the selecting step and the determining step utilizing subsequent elements from the VID mask table and the VID filter table; and if yes, referring to a currently used port membership element in a port membership table to ensure the ingress port is a member of the current VLAN.

9. The bridge of claim 6, wherein the incoming tagged frame is a C-tagged frame.

10. The bridge of claim 6, wherein the incoming tagged frame is a S-tagged frame.

* * * * *